March 10, 1931.  E. E. GREVE  1,796,252
PUMP VALVE
Filed Nov. 19, 1927
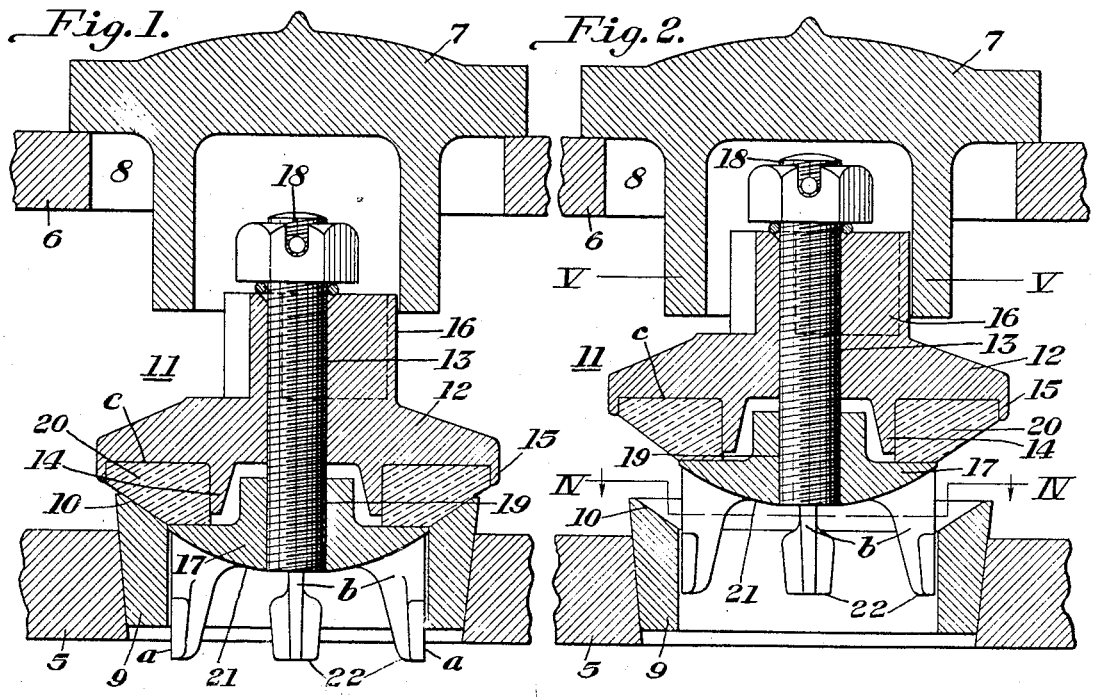
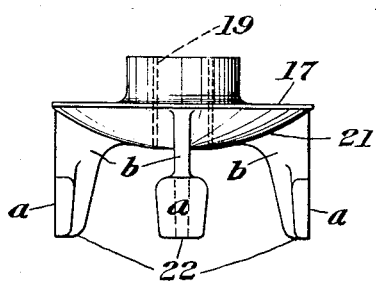
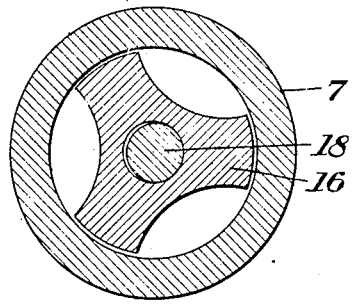
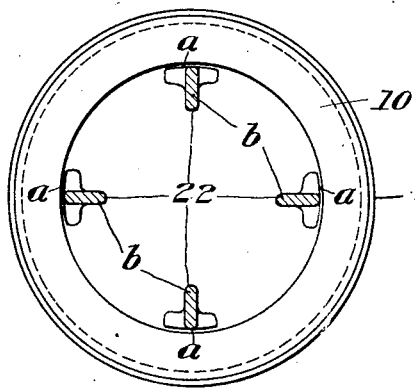
Inventor
E. E. Greve
by W. F. Doolittle
Attorney Patented Mar. 10, 1931

1,796,252

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

PUMP VALVE

Application filed November 19, 1927. Serial No. 234,423.

My invention relates to improvements in pump valves, and particularly to a water valve employed in the water cylinders of high pressure steam pumps of the character employed in the oil fields, although the valve structure embodying my invention may be utilized for other types of pumps.

The valve of the present invention is especially designed for handling heavy fluids, and one of the principal objects of the present invention is to provide a valve structure that will provide a maximum opening for the passage of fluids without the necessity of increasing the diameter of the bore through the valve seat.

Other important objects of my invention are, to provide a valve of the character specified in which the least possible obstruction is presented to the passage of fluid through the valve when the valve is in open position, and to provide a construction in which the depending guide means cooperating with the valve are of such form that eddy currents will not be set up adjacent the valve.

Further additional objects and advantages of the present invention will be pointed out or become apparent from a consideration of an operative embodiment as hereinafter described, and as shown in the accompanying drawings.

In the drawings:

Fig. 1 is a vertical sectional view of a valve structure embodying my invention, showing the valve in closed position and disposed in a portion of a cylinder of a pump;

Fig. 2, a view similar to Fig. 1, showing the valve in open position;

Fig. 3, a detail elevational view of a part of the valve;

Fig. 4, a horizontal sectional view, the section being taken on line IV—IV of Fig. 2; and Fig. 5, a horizontal sectional view taken on line V—V of Fig. 2.

In the drawings, I have shown my invention in connection with a portion of a pump cylinder construction including a wall portion 5, a wall portion 6, and a guide gasket or follower 7, said gasket being positioned over and in an opening 8 of wall 6. Wall 5 is formed to receive a hollow valve seat member 9, the latter being shown placed therein and formed with an annular inclined or tapered working face 10.

The valve embodying my invention is designated generally by the numeral 11 and, as illustrated and as preferred, it includes a body portion 12 of annular form provided with a centrally disposed bore 13, an inner depending flange 14, an outer flange 15, and an upper guide portion 16. In addition to the body portion, the valve includes a lower member 17, the latter being designed to be connected with the body by means of a threaded stud 18 entered in the bore of the body and extending therethrough and into a threaded bore 19 of the body of said member 17.

Member 17 is adjustably connected with the body and functions as a support for a packing or insert 20 and as a lower guide for the valve. Member 17 is so designed as to provide the least possible obstruction to a free flow of fluid when the valve is in open position. Thus, it is formed with a curved convex bottom face 21 and with depending wings or members 22 of a character to properly function without presenting an unnecessary obstruction to the flow of fluid. The convex curvature of the face 21 approximately coincides with the taper of the working face 10 of the valve seat 9. It will be noted that the stud or pin 18 does not project beyond the lower curved face 21 of member 17 and, therefore, does not form a projecting part. The lower end of the stud is preferably flush with the face 21.

As particularly shown by Fig. 3, these depending members 22 are formed with a relatively broad curved contacting face or surface $a$ and with a relatively narrow connecting portion $b$. The contacting surfaces are adapted to make contact with the curved interior wall of the valve seat during the movements of the valve relatively to its seat, these surfaces providing efficient guiding means. The arrangement of the parts is such that, when the valve is in its extreme open position, the faces $a$ will still be engaged with the wall of the bore of the seat, but the narrow portion of the wings will be above or out of the bore.

By spacing the member 17 away from the body 12, as shown, and by the provision of the flanges 14 and 15 and the flat face $c$ formed on the body, I provide very desirable means for receiving a packing or insert 20, said insert being bevelled on its lower face to form a tight joint with the inclined portion of the valve seat.

I claim:

1. A pump valve of the character described including a body portion having an integral upper guide member, a lower detachable guide member, and means for connecting the guide members, said detachable guide member having a convex fluid contacting face and a depending member provided with a relatively large contacting face and a relatively narrow connecting portion, the relatively narrow connecting portion being adjacent said convex face and coacting therewith in the open position of the valve to form an outlet with minimum obstruction facilitating discharge of fluid.

2. In a pump valve structure of the character described, the combination with a valve seat, a valve proper comprising a body having an integral upper guide member, a lower detachable guide member, and means for adjustably connecting the detachable guide member with the body, said detachable guide member having a convex fluid contacting face and a depending member provided with a relatively large contacting face entered in the valve seat, and a relatively narrow portion connecting the contacting face with the said detachable guide member, the relatively narrow connecting portion being adjacent said convex face and coacting therewith in the open position of the valve to form an outlet with minimum obstruction facilitating discharge of fluid.

3. In a pump valve structure of the character described, the combination with a valve seat having a tapered working face, a valve proper including a body portion and a lower member spaced from and carried by the body, said member having a convex lower face whose curvature approximately coincides with the taper of the said working face of the valve seat, a connecting member passed through the body inserted in the lower member and terminating substantially flush with the convex face, said convex surface in the open position of the valve facilitating discharge of fluid.

4. In a pump valve structure of the character described comprising a seat member having a tapering seating face, a valve proper comprising a body having an upper integral guide member, a lower detachable guide member formed with a convex fluid contacting face and with a depending element, said element having a relatively large contacting face for cooperation with the seat and a relatively narrow portion connecting the face with the lower guide member, the relatively narrow connecting portion being adjacent said convex face and coacting therewith in the open position of the valve to form an outlet with minimum obstruction facilitating discharge of fluid, said lower guide member spaced from the body, a tapered seating element interposed between the body and the lower guide member, and a connecting member passed through the body and entered in the lower guide member.

5. In a pump valve structure of the character described comprising a seat member having a tapering seating face, a valve proper comprising a body having an upper integral guide member, a lower detachable guide member formed with a convex fluid contacting face and with a depending element, said element having a relatively large contacting face for cooperation with the seat and a relatively narrow portion connecting the face with the lower guide member, the relatively narrow connecting portion being adjacent said convex face and coacting therewith in the open position of the valve to form an outlet with minimum obstruction facilitating discharge of fluid, said lower guide member spaced from the body, a tapered seating element interposed between the body and the lower guide member, said convex face having its curvature approximately coinciding with the taper of the seating face of the valve seat and the said co-acting seating element, and a connecting member passed through the body, entered in the lower guide member and terminating flush with the convex face.

6. In a pump valve structure of the class described, seating means, a valve provided with a convex fluid-contacting surface, a guide member extending from the valve into the opening of said means, said guide member being relatively narrow adjacent said face, said guide member and convex face coacting in the open position of the valve to form an outlet with minimum obstruction facilitating discharge of fluid.

In testimony whereof I affix my signature.

EDGAR E. GREVE.